United States Patent
Lv et al.

(10) Patent No.: US 10,568,178 B2
(45) Date of Patent: Feb. 18, 2020

(54) COLOR TEMPERATURE ADJUSTMENT METHOD AND DEVICE, LIGHT SOURCE, DISPLAY APPARATUS

(71) Applicants: BOE Technology Group Co., Ltd., Beijing (CN); Hefei BOE Display Lighting Co., Ltd., Anhui (CN)

(72) Inventors: Tu Lv, Beijing (CN); Zuchuan Shi, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 88 days.

(21) Appl. No.: 15/743,047

(22) PCT Filed: Jun. 8, 2017

(86) PCT No.: PCT/CN2017/087555
§ 371 (c)(1),
(2) Date: Jan. 9, 2018

(87) PCT Pub. No.: WO2017/215508
PCT Pub. Date: Dec. 21, 2017

(65) Prior Publication Data
US 2019/0082509 A1    Mar. 14, 2019

(30) Foreign Application Priority Data
Jun. 15, 2016    (CN) .......................... 2016 1 0424120

(51) Int. Cl.
*H05B 33/08*    (2006.01)
*G06N 3/02*    (2006.01)
(Continued)

(52) U.S. Cl.
CPC .......... *H05B 33/0857* (2013.01); *G06N 3/02* (2013.01); *G09G 3/2003* (2013.01); *G09G 3/22* (2013.01)

(58) Field of Classification Search
None
See application file for complete search history.

(56) References Cited

U.S. PATENT DOCUMENTS

2012/0086338 A1*    4/2012    Kim ................... H05B 33/0815
                                                  315/86
2015/0022093 A1    1/2015    Smith et al.

FOREIGN PATENT DOCUMENTS

CN    102548113 A    7/2012
CN    102595679 A    7/2012
(Continued)

OTHER PUBLICATIONS

International search report dated Aug. 29, 2017 for corresponding application PCT/CN2017/087555 with English translation attached.
(Continued)

*Primary Examiner* — Gustavo Polo
(74) *Attorney, Agent, or Firm* — Nath, Goldberg & Meyer; Joshua B. Goldberg; Stephanie Majkut

(57) ABSTRACT

The present disclosure provides a color temperature adjustment method, a color temperature adjustment device, a light source including the color temperature adjustment device, and a display apparatus including the light source. The color temperature adjustment method includes acquiring current environment information; obtaining a target color temperature corresponding to the current environment information by using fuzzy neutral network; and providing an electrical signal corresponding to the target color temperature to a light emitting unit so that a color temperature of the light emitting unit reaches the target color temperature.

19 Claims, 4 Drawing Sheets

(51) Int. Cl.
*G09G 3/20* (2006.01)
*G09G 3/22* (2006.01)

(56) References Cited

FOREIGN PATENT DOCUMENTS

| | | |
|---|---|---|
| CN | 104077991 A | 10/2014 |
| CN | 104363676 A | 2/2015 |
| CN | 104867476 A | 8/2015 |
| CN | 104936334 A | 9/2015 |
| CN | 104978947 A | 10/2015 |
| CN | 104981077 A | 10/2015 |
| CN | 105632413 A | 6/2016 |
| CN | 105869580 A | 8/2016 |

OTHER PUBLICATIONS

Chinese office action dated Nov. 29, 2017 for corresponding application Cn 201610424120.3 with English translation attached.

\* cited by examiner

COLOR TEMPERATURE ADJUSTMENT METHOD AND DEVICE, LIGHT SOURCE, DISPLAY APPARATUS

CROSS-REFERENCE TO RELATED APPLICATION

This is a National Phase Application filed under 35 U.S.C. 371 as a national stage of PCT/CN2017/087555, filed on Jun. 8, 2017, an application claiming the benefit of priority to China Patent Application No. 201610424120.3 filed on Jun. 15, 2016, the contents of which are incorporated herein in their entirety by reference.

TECHNICAL FIELD

The present disclosure relates to the field of display technology, and particularly relates to a color temperature adjustment method, a color temperature adjustment device, a light source including the color temperature adjustment device, and a display apparatus including the light source.

BACKGROUND

Color temperature is the characterization of color quality of a light source, and the most common indicator of spectral quality of the light source. Color temperature has a significant impact on human psychology, and influences of different color temperature on human psychological response vary greatly.

SUMMARY

The present disclosure proposes a color temperature adjustment method and device, a light source and a display apparatus, which adjust color temperature in combination with external environment to improve human eye comfort.

The present disclosure provides a color temperature adjustment method, including:

acquiring current environment information;

obtaining a target color temperature corresponding to the current environment information by using fuzzy neutral network; and adjusting a color temperature of a light emitting unit to be the target color temperature.

Optionally, before the step of acquiring the current environment information, the color temperature adjustment method further includes:

for each type of environment information, setting a plurality of environment information fuzzy sets and a plurality of membership degree functions (also referred to as "environment membership degree function") between the type of environment information and the plurality of environment information fuzzy sets; setting a plurality of color temperature fuzzy sets and a plurality of membership degree functions (also referred to as "color temperature membership degree function") between color temperature and the plurality of color temperature fuzzy sets; and setting a correspondence rule between the environment information fuzzy sets and the color temperature fuzzy sets.

Optionally, the step of obtaining the target color temperature corresponding to the current environment information by using fuzzy neutral network includes:

for each type of environment information, performing fuzzification on the current environment information according to the environment membership degree functions to obtain respective membership degrees of the current environment information with respect to the environment information fuzzy sets;

obtaining, through a neutral network model, applicability of each color temperature fuzzy set with respect to the current environment information according to the membership degrees of the current environment information with respect to the environment information fuzzy sets and the correspondence rule between the environment information fuzzy sets and the color temperature fuzzy sets; and performing defuzzification on the color temperature fuzzy set with the maximum applicability according to the color temperature membership degree function, to obtain a color temperature corresponding to the maximum applicability as the target color temperature.

Optionally, the environment information includes first environment information and second environment information; the environment information fuzzy sets include a plurality of first fuzzy sets for the first environment information and a plurality of second fuzzy sets for the second environment information; the environment membership degree functions include a plurality of first membership degree functions between the first environment information and the plurality of first fuzzy sets and a plurality of second membership degree functions between the second environment information and the plurality of second fuzzy sets; and the correspondence rule between the environment information fuzzy sets and the color temperature fuzzy sets includes correspondence between a plurality of combination results, obtained by combining the plurality of first fuzzy sets and the plurality of second fuzzy sets, and the plurality of color temperature fuzzy sets.

Optionally, the neutral network model includes an input layer, a hidden layer and an output layer which are sequentially arranged, the input layer includes a plurality of first membership degree nodes in one-to-one correspondence with the plurality of first fuzzy sets respectively and a plurality of second membership degree nodes in one-to-one correspondence with the plurality of second fuzzy sets respectively, an output value of each first membership degree node being a membership degree of the first environment information with respect to the first fuzzy set corresponding to the first membership degree node, and an output value of each second membership degree node being a membership degree of the second environment information with respect to the second fuzzy set corresponding to the second membership degree node;

the hidden layer includes a plurality of combination result nodes in one-to-one correspondence with the plurality of combination results respectively, wherein when a P-th combination result is obtained by combining an i-th first fuzzy set and a j-th second fuzzy set, an output value of a P-th combination result node corresponding to the P-th combination result is calculated according to the following formula:

$$R_P = \min(\mu1_i W2_{Pi}, \mu2_j W2_{Pj})$$

where $R_P$ is the output value of the P-th combination result node, $\mu1_i$ is an output value of an i-th first membership degree node; $\mu2_j$ is an output value of a j-th second membership degree node; $W2_{Pi}$ is a connection weight between the P-th combination result node and the i-th first membership degree node; and $W2_{Pj}$ is a connection weight between the P-th combination result node and the j-th second membership degree node; and the output layer includes a plurality of output nodes in one-to-one correspondence with the plurality of color temperature fuzzy sets respectively, wherein an output value of each output node is applicability of a corresponding color temperature fuzzy set, and is calculated according to the following formula:

$$a_Q = \Sigma_P R_P W1_{QP}$$

where $a_Q$ is an output value of a Q-th output node, and $W1_{QP}$ is a connection weight between the Q-th output node and the P-th combination result node.

Optionally, the environment information includes one or more of ambient luminous flux, current time, ambient atmosphere pressure, ambient temperature and weather.

Optionally, the step of acquiring the current environment information is performed at a predetermined frequency.

Optionally, the environment information includes ambient luminous flux and current time; the environment information fuzzy sets include a plurality of luminous flux fuzzy sets for the ambient luminous flux and a plurality of time fuzzy sets for the current time; the environment membership degree functions include a plurality of membership degree functions (also referred to as "luminous flux membership degree function") between the ambient luminous flux and the plurality of luminous flux fuzzy sets, and a plurality of membership degree functions (also referred to as "time membership degree function") between the current time and the plurality of time fuzzy sets; the correspondence rule between the environment information fuzzy sets and the color temperature fuzzy sets includes correspondence between a plurality of combination results, obtained by combining the plurality of luminous flux fuzzy sets and the plurality of time fuzzy sets, and the plurality of color temperature fuzzy sets.

Optionally, the neutral network model includes an input layer, a hidden layer and an output layer which are sequentially arranged, the input layer includes a plurality of luminous flux membership degree nodes in one-to-one correspondence with the plurality of luminous flux fuzzy sets respectively and a plurality of time membership degree nodes in one-to-one correspondence with the plurality of time fuzzy sets respectively, an output value of each luminous flux membership degree node being a membership degree of the ambient luminous flux with respect to the luminous flux fuzzy set corresponding to the luminous flux membership degree node, and an output value of each time membership degree node being a membership degree of the current time with respect to the time fuzzy set corresponding to the time membership degree node;

the hidden layer includes a plurality of combination result nodes in one-to-one correspondence with the plurality of combination results respectively, wherein when a P-th combination result is obtained by combining an i-th luminous flux fuzzy set and a j-th time fuzzy set, an output value of a P-th combination result node corresponding to the P-th combination result is calculated according to the following formula:

$$R_P = \min(\mu 1_i W2_{Pi}, \mu 2_j W2_{Pj})$$

where $R_p$ is the output value of the P-th combination result node, $\mu 1_i$ is an output value of an i-th luminous flux membership degree node; $\mu 2_j$ is an output value of a j-th time membership degree node; $W2_{Pi}$ is a connection weight between the P-th combination result node and the i-th luminous flux membership degree node; and $W2_{Pj}$ is a connection weight between the P-th combination result node and the j-th time membership degree node; and the output layer includes a plurality of output nodes in one-to-one correspondence with the plurality of color temperature fuzzy sets respectively, wherein an output value of each output node is applicability of a corresponding color temperature fuzzy set, and is calculated according to the following formula:

$$a_Q = \Sigma_P R_P W1_{QP}$$

where $a_Q$ is an output value of a Q-th output node, and $W1_{QP}$ is a connection weight between the Q-th output node and the P-th combination result node.

Optionally, each of the plurality of luminous flux membership degree functions between the ambient luminous flux and the plurality of luminous flux fuzzy sets is a triangular membership degree function, each of the plurality of time membership degree functions between the current time and the plurality of time fuzzy sets is a triangular membership degree function, and each of the plurality of color temperature membership degree functions between the color temperature and the plurality of color temperature fuzzy sets is a triangular membership degree function.

Optionally, the plurality of luminous flux fuzzy sets include:

a first luminous flux fuzzy set for the ambient luminous flux of 0 to 200 lm;

a second luminous flux fuzzy set for the ambient luminous flux of 50 lm to 2000 lm;

a third luminous flux fuzzy set for the ambient luminous flux of 200 lm to 5000 lm; and a fourth luminous flux fuzzy set for the ambient luminous flux of 4000 lm to 10000 lm.

Optionally, the plurality of time fuzzy sets include:

a first time fuzzy set for the case that the current time is in a range of 0 to 10 h;

a second time fuzzy set for the case that the current time is in a range of 9 h to 19 h; and a third time fuzzy set for the case that the current time is in a range of 16 h to 24 h.

Optionally, the plurality of color temperature fuzzy sets include:

a first color temperature fuzzy set for the color temperature of 0 to 3000K;

a second color temperature fuzzy set for the color temperature of 2000K to 4000K;

a third color temperature fuzzy set for the color temperature of 3000K to 5000K;

a fourth color temperature fuzzy set for the color temperature of 4000K to 6000K;

a fifth color temperature fuzzy set for the color temperature of 5000K to 8000K; and a sixth color temperature fuzzy set for the color temperature of 6000K to 8000K.

Optionally, the correspondence between the plurality of combination results and the plurality of color temperature fuzzy sets is as follows:

a combination result of the first luminous flux fuzzy set and the first time fuzzy set and a combination result of the first luminous flux fuzzy set and the third time fuzzy set each correspond to the first color temperature fuzzy set;

a combination result of the first luminous flux fuzzy set and the second time fuzzy set, a combination result of the second luminous flux fuzzy set and the first time fuzzy set, a combination result of the second luminous flux fuzzy set and the third time fuzzy set and a combination result of the third luminous flux fuzzy set and the first time fuzzy set each correspond to the second color temperature fuzzy set;

a combination result of the second luminous flux fuzzy set and the second time fuzzy set corresponds to the third color temperature fuzzy set;

a combination result of the third luminous flux fuzzy set and the second time fuzzy set corresponds to the fourth color temperature fuzzy set;

a combination result of the third luminous flux fuzzy set and the third time fuzzy set, a combination result of the fourth luminous flux fuzzy set and the first time fuzzy set and a combination result of the fourth luminous flux fuzzy set and the third time fuzzy set each correspond to the fifth color temperature fuzzy set; and a combination result of the fourth luminous flux fuzzy set and the second time fuzzy set corresponds to the sixth color temperature fuzzy set.

Optionally, before the step of acquiring the current environment information, the color temperature adjustment method further includes:

establishing an initial neutral network model, in which an initial value of each connection weight is in a range of [−1, 1]; and training the initial neutral network model to adjust the connection weights of the neutral network model, and finishing establishment of the neutral network model when a preset training condition is met.

Accordingly, the present disclosure further provides a color temperature adjustment device, including:

an environment information acquisition module configured to acquire current environment information;

a target color temperature obtaining module connected with the environment information acquisition module and configured to obtain a target color temperature corresponding to the current environment information using fuzzy neutral network; and an adjustment module connected with the target color temperature obtaining module and configured to adjust a color temperature of a light emitting unit to be the target color temperature.

Optionally, the color temperature adjustment device further includes:

a setting module configured to set, for each type of environment information, a plurality of environment information fuzzy sets and a plurality of environment membership degree functions between the environment information and the plurality of environment information fuzzy sets; set a plurality of color temperature fuzzy sets and a plurality of color temperature membership degree functions between color temperature and the plurality of color temperature fuzzy sets; and set a correspondence rule between the environment information fuzzy sets and the color temperature fuzzy sets;

wherein the target color temperature obtaining module includes:

a fuzzification unit configured to perform, for each type of environment information, fuzzification on the current environment information according to the environment membership degree functions, to obtain respective membership degrees of the current environment information with respect to the environment information fuzzy sets;

an applicability obtaining unit connected with the fuzzification unit and the setting module, respectively, and configured to obtain, through a neutral network model, the applicability of each color temperature fuzzy set with respect to the current environment information according to the membership degrees of the current environment information with respect to the environment information fuzzy sets and the correspondence rule between the environment information fuzzy sets and the color temperature fuzzy sets; and a defuzzification unit connected with the applicability obtaining unit and configured to perform defuzzification on the color temperature fuzzy set with the maximum applicability according to the color temperature membership degree function, to obtain a color temperature corresponding to the maximum applicability as the target color temperature.

Optionally, the environment information includes first environment information and second environment information; the environment information fuzzy sets include a plurality of first fuzzy sets for the first environment information and a plurality of second fuzzy sets for the second environment information; the environment membership degree functions include a plurality of first membership degree functions between the first environment information and the plurality of first fuzzy sets and a plurality of second membership degree functions between the second environment information and the plurality of second fuzzy sets; and the correspondence rule between the environment information fuzzy sets and the color temperature fuzzy sets includes correspondence between a plurality of combination results, obtained by combining the plurality of first fuzzy sets and the plurality of second fuzzy sets, and the plurality of color temperature fuzzy sets.

Optionally, the neutral network model includes an input layer, a hidden layer and an output layer which are sequentially arranged, the input layer includes a plurality of first membership degree nodes in one-to-one correspondence with the plurality of first fuzzy sets respectively and a plurality of second membership degree nodes in one-to-one correspondence with the plurality of second fuzzy sets respectively, an output value of each first membership degree node being a membership degree of the first environment information with respect to the first fuzzy set corresponding to the first membership degree node, and an output value of each second membership degree node being a membership degree of the second environment information with respect to the second fuzzy set corresponding to the second membership degree node;

the hidden layer includes a plurality of combination result nodes in one-to-one correspondence with the plurality of combination results respectively, wherein when a P-th combination result is obtained by combining an i-th first fuzzy set and a j-th second fuzzy set, an output value of a P-th combination result node corresponding to the P-th combination result is calculated according to the following formula:

$$R_P = \min(\mu 1_i W2_{Pi}, \mu 2_j W2_{Pj})$$

where $R_p$ is the output value of the P-th combination result node, $\mu 1_i$ is an output value of an i-th first membership degree node; $\mu 2_j$ is an output value of a j-th second membership degree node; $W2_{Pi}$ is a connection weight between the P-th combination result node and the i-th first membership degree node; and $W2_{Pj}$ is a connection weight between the P-th combination result node and the j-th second membership degree node; and the output layer includes a plurality of output nodes in one-to-one correspondence with the plurality of color temperature fuzzy sets respectively, wherein an output value of each output node is applicability of a corresponding color temperature fuzzy set, and is calculated according to the following formula:

$$a_Q = \Sigma_p R_p W1_{QP}$$

where $a_Q$ is an output value of a Q-th output node, and $W1_{QP}$ is a connection weight between the Q-th output node and the P-th combination result node.

Optionally, the environment information includes one or more of ambient luminous flux, current time, ambient atmosphere pressure, ambient temperature and weather.

Optionally, the environment information acquisition module is configured to acquire the current environment information at a predetermined frequency.

Optionally, the environment information includes ambient luminous flux and current time; the environment information fuzzy sets include a plurality of luminous flux fuzzy sets for the ambient luminous flux and a plurality of time fuzzy sets for the current time; the environment membership degree functions include a plurality of membership degree functions (also referred to as "luminous flux membership degree function") between the ambient luminous flux and the plurality of luminous flux fuzzy sets, and a plurality of membership degree functions (also referred to as "time membership degree function") between the current time and the plurality of time fuzzy sets; the correspondence rule between the environment information fuzzy sets and the color temperature fuzzy sets includes correspondence between a plurality of combination results, obtained by combining the plurality of luminous flux fuzzy sets and the plurality of time fuzzy sets, and the plurality of color temperature fuzzy sets.

Optionally, the neutral network model includes an input layer, a hidden layer and an output layer which are sequentially arranged, the input layer includes a plurality of luminous flux membership degree nodes in one-to-one correspondence with the plurality of luminous flux fuzzy sets respectively and a plurality of time membership degree nodes in one-to-one correspondence with the plurality of time fuzzy sets respectively, an output value of each luminous flux membership degree node being a membership degree of the ambient luminous flux with respect to the luminous flux fuzzy set corresponding to the luminous flux membership degree node, and an output value of each time membership degree node being a membership degree of the current time with respect to the time fuzzy set corresponding to the time membership degree node;

the hidden layer includes a plurality of combination result nodes in one-to-one correspondence with the plurality of combination results respectively, wherein when a P-th combination result is obtained by combining an i-th luminous flux fuzzy set and a j-th time fuzzy set, an output value of a P-th combination result node corresponding to the P-th combination result is calculated according to the following formula:

$$R_P = \min(\mu 1_i W2_{Pi}, \mu 2_j W2_{Pj})$$

where $R_p$ is the output value of the P-th combination result node, $\mu 1_i$ is an output value of an i-th luminous flux membership degree node; $\mu 2_j$ is an output value of a j-th time membership degree node; $W2_{Pi}$ is a connection weight between the P-th combination result node and the i-th luminous flux membership degree node; and $W2_{Pj}$ is a connection weight between the P-th combination result node and the j-th time membership degree node; and the output layer includes a plurality of output nodes in one-to-one correspondence with the plurality of color temperature fuzzy sets respectively, wherein an output value of each output node is applicability of a corresponding color temperature fuzzy set, and is calculated according to the following formula:

$$a_Q = \Sigma_p R_p W1_{QP}$$

where $a_Q$ is an output value of a Q-th output node, and $W1_{QP}$ is a connection weight between the Q-th output node and the P-th combination result node.

Optionally, the plurality of luminous flux fuzzy sets include:

a first luminous flux fuzzy set for the ambient luminous flux of 0 to 200 lm;

a second luminous flux fuzzy set for the ambient luminous flux of 50 lm to 2000 lm;

a third luminous flux fuzzy set for the ambient luminous flux of 200 lm to 5000 lm; and a fourth luminous flux fuzzy set for the ambient luminous flux of 4000 lm to 10000 lm;

each of the plurality of luminous flux membership degree functions between the ambient luminous flux and the plurality of luminous flux fuzzy sets is a triangular membership degree function.

Optionally, the plurality of time fuzzy sets include:

a first time fuzzy set for the case that the current time is in a range of 0 to 10 h;

a second time fuzzy set for the case that the current time is in a range of 9 h to 19 h; and a third time fuzzy set for the case that the current time is in a range of 16 h to 24 h;

each of the plurality of time membership degree functions between the current time and the plurality of time fuzzy sets is a triangular membership degree function.

Optionally, the plurality of color temperature fuzzy sets include:

a first color temperature fuzzy set for the color temperature of 0 to 3000K;

a second color temperature fuzzy set for the color temperature of 2000K to 4000K;

a third color temperature fuzzy set for the color temperature of 3000K to 5000K;

a fourth color temperature fuzzy set for the color temperature of 4000K to 6000K;

a fifth color temperature fuzzy set for the color temperature of 5000K to 8000K; and a sixth color temperature fuzzy set for the color temperature of 6000K to 8000K;

each of the plurality of color temperature membership degree functions between the color temperature and the plurality of color temperature fuzzy sets is a triangular membership degree function.

Optionally, the correspondence between the plurality of combination results and the plurality of color temperature fuzzy sets is as follows:

a combination result of the first luminous flux fuzzy set and the first time fuzzy set and a combination result of the first luminous flux fuzzy set and the third time fuzzy set each correspond to the first color temperature fuzzy set;

a combination result of the first luminous flux fuzzy set and the second time fuzzy set, a combination result of the second luminous flux fuzzy set and the first time fuzzy set, a combination result of the second luminous flux fuzzy set and the third time fuzzy set and a combination result of the third luminous flux fuzzy set and the first time fuzzy set each correspond to the second color temperature fuzzy set;

a combination result of the second luminous flux fuzzy set and the second time fuzzy set corresponds to the third color temperature fuzzy set;

a combination result of the third luminous flux fuzzy set and the second time fuzzy set corresponds to the fourth color temperature fuzzy set;

a combination result of the third luminous flux fuzzy set and the third time fuzzy set, a combination result of the fourth luminous flux fuzzy set and the first time fuzzy set and a combination result of the fourth luminous flux fuzzy set and the third time fuzzy set each correspond to the fifth color temperature fuzzy set; and a combination result of the fourth luminous flux fuzzy set and the second time fuzzy set corresponds to the sixth color temperature fuzzy set.

Optionally, the color temperature adjustment device further includes:

an initial model establishing module configured to establish an initial neutral network model, in which an initial value of each connection weight is in a range of [−1, 1]; and a training module configured to train the initial neutral network model to adjust the connection weights of the neutral network model, and finish establishment of the neutral network model when a preset training condition is met.

Accordingly, the present disclosure further provides a light source, including a light emitting unit and a color temperature adjustment device connected to the light emitting unit, wherein the color temperature adjustment device is the above color temperature adjustment device provided by the present disclosure.

Accordingly, the present disclosure further provides a display apparatus, including a display panel and the above light source provided by the present disclosure, wherein the light source is configured as a backlight source of the display apparatus.

BRIEF DESCRIPTION OF THE DRAWINGS

The accompanying drawings, which serve to provide a further understanding of the present disclosure and constitute a part of this specification, are used for explaining the present disclosure together with the following specific implementations, rather than limiting the present disclosure. In the drawings.

DETAILED DESCRIPTION

Specific implementations of the present disclosure will be described in detail below in conjunction with the accompanying drawings. It should be understood that, the specific implementations described herein are merely used for describing and explaining the present disclosure, rather than limiting the present disclosure.

Applicants found that most of devices for adjusting light sources in the market are brightness adjustment devices, for adjusting brightness of the light sources only, but the light sources generally have single color temperature. In order to address the problem of single color temperature of the light sources, an approach of adjusting color temperature of a light source using a color temperature adjustment device has been proposed. For example, a color temperature adjustment device is mounted in a display so that a user can control the color temperature adjustment device to adjust the color temperature for a screen of the display. The color temperature adjustment performed by this color temperature adjustment device has poor real-time performance and low accuracy, can only achieve the result of simply changing color temperature of a light emitting unit, but fails to automatically provide appropriate color temperature for the user to improve human eye comfort.

Figure 1:
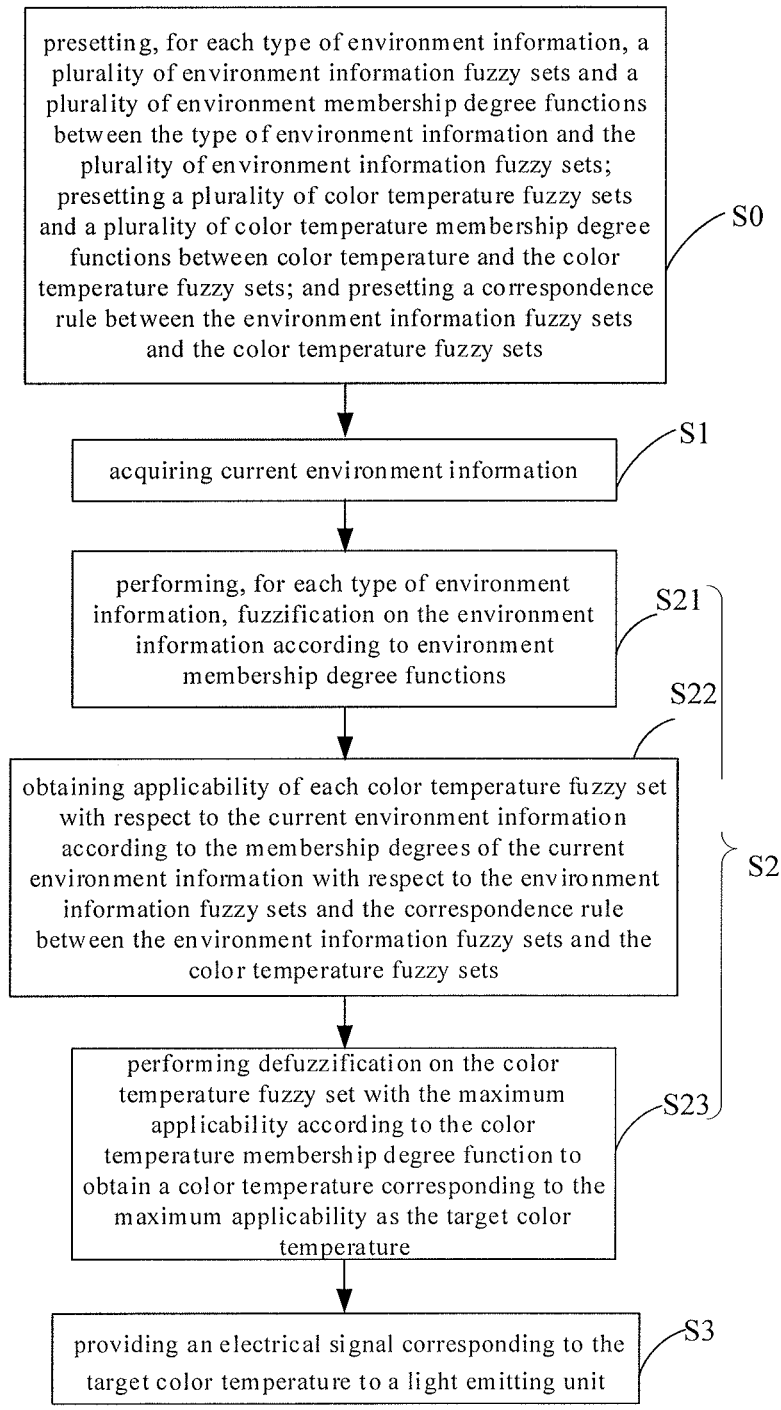
FIG. 1 is a schematic flow chart of a color temperature adjustment method according to an embodiment of the present disclosure.

As an aspect of the present disclosure, there is provided a color temperature adjustment method, as shown in FIG. 1, including the following steps S1 to S3.

At step S1, current environment information is acquired at a predetermined frequency. Herein, the current environment information refers to current values of external environmental factors (e.g., ambient luminous flux, time, ambient atmosphere pressure, ambient temperature, weather such as cloudy, sunny, etc., or the like) that affect human eye comfort; the predetermined frequency may be set according to actual needs, for example, may be set as a high frequency such as 1 to 2 times per second in order to improve real-time performance of color temperature adjustment. In the present example, environment information is acquired periodically, but the present disclosure is not limited thereto, for example, environment information may be acquired based on an instruction given by a user.

At step S2, a target color temperature corresponding to the current environment information is acquired, such that when color temperature of a light emitting unit reaches the target color temperature, human eye comfort in current environment is excellent. As an example, the current environment information includes current ambient luminous flux, and the target color temperature may be set in a cool color range in the case of large ambient luminous flux and in a warm color range in the case of small ambient luminous flux. As another example, the current environment information may include current time, and the target color temperature may be set in a cool color range to give a fresh feeling when the current time is in the daytime and in a warm color range to give a warm feeling when the current time is at night. Optionally, the ambient luminous flux may be detected by a sensor, and the current time may be acquired by a clock chip.

At step S3, an electrical signal corresponding to the target color temperature is provided to a light emitting unit so that a color temperature of the light emitting unit reaches the target color temperature. It should be noted that every time the environment information is acquired, steps S2 and S3 are performed once.

The color temperature adjustment method according to embodiments of the present disclosure can adjust the color temperature of the light emitting unit according to the current environment information, so that the actual color temperature of the light emitting unit can be changed as the environment changes, thus improving human eye comfort.

In step S2, a plurality of environment information fuzzy sets may be set for each type of environment information. For example, when the environment information includes current time, the plurality of environment information fuzzy sets are a plurality of time fuzzy sets, which include a first time fuzzy set for the case that the current time is before dawn, a second time fuzzy set for the case that the current time belongs to daytime, a third time fuzzy set for the case that the current time belongs to night, and the like. The target color temperature may be acquired in the following way: an environment information fuzzy set corresponding to the current environment information is first acquired according to a fuzzification algorithm, a color temperature fuzzy set corresponding to the current environment information is then determined according to the color temperature fuzzy set corresponding to the environment information fuzzy set, and a target color temperature is finally obtained according to the determined color temperature fuzzy set by using a defuzzification algorithm.

Herein, the term "fuzzification" may denote determining membership degree of a given independent variable with respect to a fuzzy set according to a predetermined membership degree function for the fuzzy set; the term "defuzzification" may denote determining a value of an independent variable, corresponding to a given membership degree, in a fuzzy set according to a predetermined membership degree function for the fuzzy set.

In an embodiment of the present disclosure, as shown in FIG. 1, prior to step S1, the color temperature adjustment method may further include:

step S0, setting, for each type of environment information, a plurality of environment information fuzzy sets and environment membership degree functions between the type of environment information and the environment information fuzzy sets; setting a plurality of color temperature fuzzy sets and membership degree functions (hereinafter referred to as "color temperature membership degree functions") between color temperature and the color temperature fuzzy sets; and setting a correspondence rule between the environment information fuzzy sets and the color temperature fuzzy sets. As described above, the environment information may include various types, for example, may include ambient luminous flux, time, ambient atmosphere pressure, ambient temperature, weather, etc.

In the embodiment of the present disclosure, step S2 may include the following steps S21 to S23.

At step S21, fuzzification is performed, for each type of environment information, on the current environment information according to environment membership degree functions to obtain respective membership degrees of the current environment information with respect to the environment information fuzzy sets of the type of environment information.

For ease of description, the following description will be given by taking the case where the environment information includes ambient luminous flux and time as an example. The environment information fuzzy sets may include luminous flux fuzzy sets for ambient luminous flux and time fuzzy sets for current time; the environment membership degree functions may include membership degree functions (hereinafter referred to as "luminous flux membership degree functions") between the ambient luminous flux and the luminous flux fuzzy sets and membership degree functions (hereinafter referred to as "time membership degree functions") between current time and the time fuzzy sets; the correspondence rule between the environment information fuzzy sets and the color temperature fuzzy sets may include correspondence between a plurality of combination results (each combination result including one luminous flux fuzzy set and one color temperature fuzzy set), obtained by combining the plurality of luminous flux fuzzy sets with the plurality of time fuzzy sets, and the plurality of color temperature fuzzy sets. It can be understood that m*n different combination results can be obtained by combining 'm' number of luminous flux fuzzy sets and 'n' number of time fuzzy sets, and each combination result may correspond to one color temperature fuzzy set. Any two combination results may correspond to two different color temperature fuzzy sets, or one color temperature fuzzy set. In other words, when a certain ambient luminous flux belongs to an x-th luminous flux fuzzy set and a certain time belongs to a y-th time fuzzy set, a corresponding color temperature fuzzy set can be determined, according to the correspondence rule.

Figure 2:
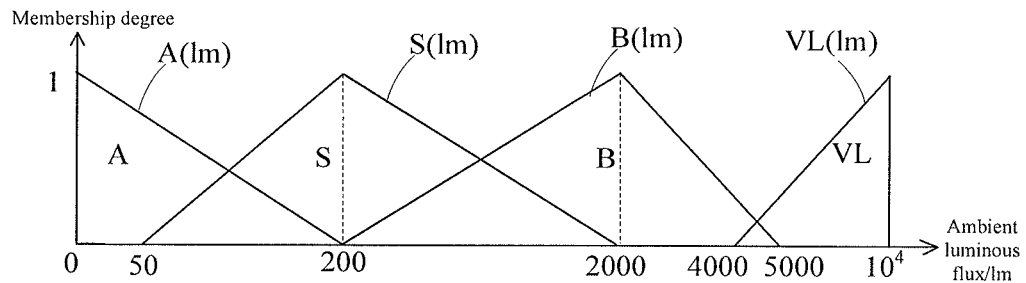
FIG. 2 is a schematic diagram of luminous flux membership degree functions between ambient luminous flux and luminous flux fuzzy sets according to an embodiment of the present disclosure.

Specifically, as shown in FIG. 2, the plurality of luminous flux fuzzy sets may include: a first luminous flux fuzzy set A (corresponding to environment with dark light) for the ambient luminous flux in the range of 0 to 200 lm (lumen); a second luminous flux fuzzy set S (corresponding to environment with normal light) for the ambient luminous flux in the range of 50 lm to 2000 lm; a third luminous flux fuzzy set B (corresponding to environment with bright light) for the ambient luminous flux in the range of 200 lm to 5000 lm; a fourth luminous flux fuzzy set VL (corresponding to environment with very bright light) for the ambient luminous flux in the range of 4000 lm to 10000 lm. Herein, the luminous flux membership degree functions (i.e., A(lm), S(lm), B(lm) and VL(lm) shown in the figure) between the ambient luminous flux and the luminous flux fuzzy sets each may be a triangular membership degree function. For example, the first luminous flux membership degree function A(lm) may be set such that the membership degree decreases from 1 to 0 when the ambient luminous flux is in the range of 0 to 200 lm; the second luminous flux membership degree function S(lm) may be set such that the membership degree increases from 0 to 1 when the ambient luminous flux is in the range of 50 lm to 200 lm and decreases from 1 to 0 when the ambient luminous flux is in the range of 200 lm to 2000 lm; the third luminous flux membership degree function B(lm) may be set such that the membership degree increases from 0 to 1 when the ambient luminous flux is in the range of 200 lm to 2000 lm and decreases from 1 to 0 when the ambient luminous flux is in the range of 2000 lm to 5000 lm; and the fourth luminous flux membership degree function VL(lm) may be set such that the membership degree increases from 0 to 1 when the ambient luminous flux is in the range of 4000 lm to 10000 lm. Needless to say, the luminous flux membership degree function is not limited to triangular membership degree function, and may be other appropriate membership degree function such as trapezoidal membership degree function.

Figure 3:
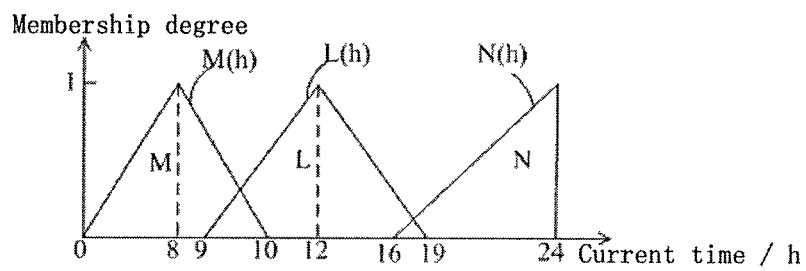
FIG. 3 is a schematic diagram of time membership degree functions between current time and time fuzzy sets according to an embodiment of the present disclosure.

As shown in FIG. 3, the plurality of time fuzzy sets may include: a first time fuzzy set M for the case that current time is in the range of 0 to 10 h (i.e., early hours from 00:00 to 10:00); a second time fuzzy set L for the case that current time is in the range of 9 h to 19 h (i.e., daytime hours from 09:00 to 19:00); and a third time fuzzy set N for the case that current time is in the range of 16 h to 24 h (i.e., night time from 16:00 to 24:00). Herein, the time membership degree functions (i.e., M(h), L(h) and N(h) shown in the figure) between current time and the time fuzzy sets each may be a triangular membership degree function. For example, the first time membership degree function M(h) may be set such that the membership degree increases from 0 to 1 when the current time is in the range of 0 to 8 h and decreases from 1 to 0 when the current time is in the range of 8 h to 10 h; the second time membership degree function L(h) may be set such that the membership degree increases from 0 to 1 when the current time is in the range of 9 h to 12 h and decreases from 1 to 0 when the current time is in the range of 12 h to 19 h; and the third time membership degree function N(h) may be set such that the membership degree increases from 0 to 1 when the current time is in the range of 16 h to 24 h. Needless to say, the time membership degree function is not limited to triangular membership degree function, and may be other appropriate membership degree function.

Figure 4:
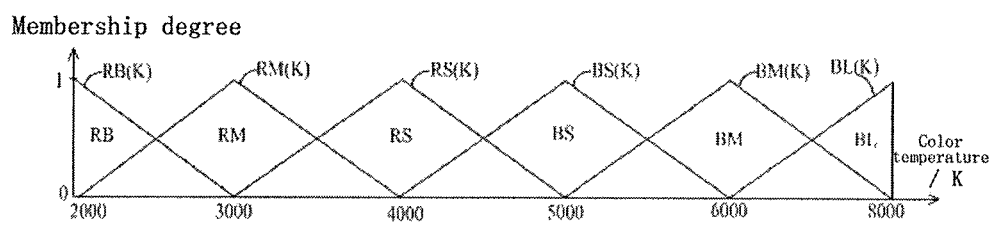
FIG. 4 a schematic diagram of color temperature membership degree functions between color temperature and color temperature fuzzy sets according to an embodiment of the present disclosure.

As shown in FIG. 4, the plurality of color temperature fuzzy sets may include: a first color temperature fuzzy set RB (corresponding to reddish light of warm color) for the color temperature in the range of 0 to 3000K (Kelvin); a second color temperature fuzzy set RM (corresponding to normal light of warm color) for the color temperature in the range of 2000K to 4000K; a third color temperature fuzzy set RS (corresponding to normal natural white light) for the color temperature in the range of 3000K to 5000K; a fourth color temperature fuzzy set BS (corresponding to bluish natural white light) for the color temperature in the range of 4000K to 6000K; a fifth color temperature fuzzy set BM (corresponding to normal light of cool color) for the color temperature in the range of 5000K to 8000K; and a sixth color temperature fuzzy set BL (corresponding to bluish light of cool color) for the color temperature in the range of 6000K to 8000K. Herein, the color temperature membership degree functions (i.e., RB(K), RM(K), RS(K), BS(K), BM(K) and BL(K) shown in the figure) between color temperature and the color temperature fuzzy sets each may be a triangular membership degree function. For example, the first color temperature membership degree function RB(K) may be set such that the membership degree decreases from 1 to 0 when the color temperature is in the range of 0 to 3000K; the second color temperature membership degree function RM(K) may be set such that the membership degree increases from 0 to 1 when the color temperature is in the range of 2000K to 3000K and decreases from 1 to 0 when the color temperature is in the range of 3000K to 4000K; the third color temperature membership degree function RS(K) may be set such that the membership degree increases from 0 to 1 when the color temperature is in the range of 3000K to 4000K and decreases from 1 to 0 when the color temperature is in the range of 4000K to 5000K; the fourth color temperature membership degree function BS(K) may be set such that the membership degree increases from 0 to 1 when the color temperature is in the range of 4000K to 5000K and decreases from 1 to 0 when the color temperature is in the range of 5000K to 6000K; the fifth color temperature membership degree function BM(K) may be set such that the membership degree increases from 0 to 1 when the color temperature is in the range of 5000K to 6000K and decreases from 1 to 0 when the color temperature is in the range of 6000K to 8000K; and the sixth color temperature membership degree function BL(K) may be set such that the membership degree increases from 0 to 1 when the color temperature is in the range of 6000K to 8000K.

Table 1 shows correspondence (i.e., the correspondence rule) between a plurality of color temperature fuzzy sets and a plurality of combination results of the luminous flux fuzzy sets and the time fuzzy sets in the embodiment of the present disclosure.

TABLE 1

| luminous flux | time fuzzy set | | |
|---|---|---|---|
| fuzzy set | M | L | N |
| A | RB | RM | RB |
| S | RM | RS | RM |
| B | RM | BS | BM |
| VL | BM | BL | BM |

As shown in table 1, a combination result of the first luminous flux fuzzy set A and the first time fuzzy set M and a combination result of the first luminous flux fuzzy set A and the third time fuzzy set N each correspond to the first color temperature fuzzy set RB; a combination result of the first luminous flux fuzzy set A and the second time fuzzy set L, a combination result of the second luminous flux fuzzy set S and the first time fuzzy set M, a combination result of the second luminous flux fuzzy set S and the third time fuzzy set N and a combination result of the third luminous flux fuzzy set B and the first time fuzzy set M each correspond to the second color temperature fuzzy set RM; a combination result of the second luminous flux fuzzy set S and the second time fuzzy set L corresponds to the third color temperature fuzzy set RS; a combination result of the third luminous flux fuzzy set B and the second time fuzzy set L corresponds to the fourth color temperature fuzzy set BS; a combination result of the third luminous flux fuzzy set B and the third time fuzzy set N, a combination result of the fourth luminous flux fuzzy set VL and the first time fuzzy set M and a combination result of the fourth luminous flux fuzzy set VL and the third time fuzzy set N each correspond to the fifth color temperature fuzzy set BM; and a combination result of the fourth luminous flux fuzzy set VL and the second time fuzzy set L corresponds to the sixth color temperature fuzzy set BL. It can be understood that, for example, when the membership degree 'a' of current ambient luminous flux with respect to the first luminous flux fuzzy set A is larger than zero, and the membership degree 'b' of current time with respect to the first time fuzzy set M is larger than zero, the membership degree 'c' of the target color temperature with respect to the first color temperature fuzzy set RB should be larger than zero, that is, there is a certain possibility that the ambient luminous flux is within the range of the first luminous flux fuzzy set A, there is a certain possibility that current time is within the range of the first time fuzzy set M, and thus, there is a certain possibility that the target color temperature is within the range of the first color temperature fuzzy set RB; on the contrary, when a=0 and b=0, c=0.

Needless to say, the number of luminous flux fuzzy sets and the luminous flux range of each luminous flux fuzzy set, the number of time fuzzy sets and the time range of each time fuzzy set, the number of color temperature fuzzy sets and the color temperature range of each color temperature fuzzy set can be set according to actual needs, which is not limited in the present disclosure. Accordingly, the correspondence rule between the environment information fuzzy sets (e.g., combination results of the luminous flux fuzzy sets and the time fuzzy sets) and the color temperature fuzzy sets may be determined according to specific settings of the fuzzy sets, as long as the following condition can be satisfied: after the color temperature fuzzy set corresponding to the current environment information is obtained according to the current environment information and the correspondence rule, human eye comfort under the condition of the obtained color temperature fuzzy set is high.

For example, the number of the luminous flux fuzzy sets may be any integer larger than 1, and the plurality of the luminous flux fuzzy sets may be set such that each of the plurality of luminous flux fuzzy sets has a luminous flux range overlapped with a luminous flux range of at least one other luminous flux fuzzy set of the plurality of luminous flux fuzzy sets. For example, the number of the time fuzzy sets may be any integer larger than 1, and the plurality of the time fuzzy sets may be set such that each of the plurality of time fuzzy sets has a time range overlapped with a time range of at least one other time fuzzy set of the plurality of time fuzzy sets.

At step S22, applicability of each color temperature fuzzy set with respect to the current environment information is obtained according to the membership degrees of the current environment information with respect to the environment information fuzzy sets and the correspondence rule between the environment information fuzzy sets and the color temperature fuzzy sets. Because the current environment information does not necessarily belong to an environment information fuzzy set in binary terms (i.e., either definitely belong to or definitely not belong to the environment information fuzzy set), but may belong to one environment information fuzzy set with a certain possibility and belong to another environment information fuzzy set with a certain possibility, the applicability of each of two color temperature fuzzy sets respectively corresponding to the two environment information fuzzy sets with respect to the current environment information is determined. The applicability of a color temperature fuzzy set with respect to current environment information may be considered as a possibility that the target color temperature corresponding to the current environment information is within a color temperature range of the color temperature fuzzy set, i.e., the membership degree of the target color temperature with respect to the color temperature fuzzy set.

At step S23, defuzzification is performed on the color temperature fuzzy set with the maximum applicability according to the color temperature membership degree function, to obtain a color temperature corresponding to the maximum applicability as the target color temperature.

Figure 5:
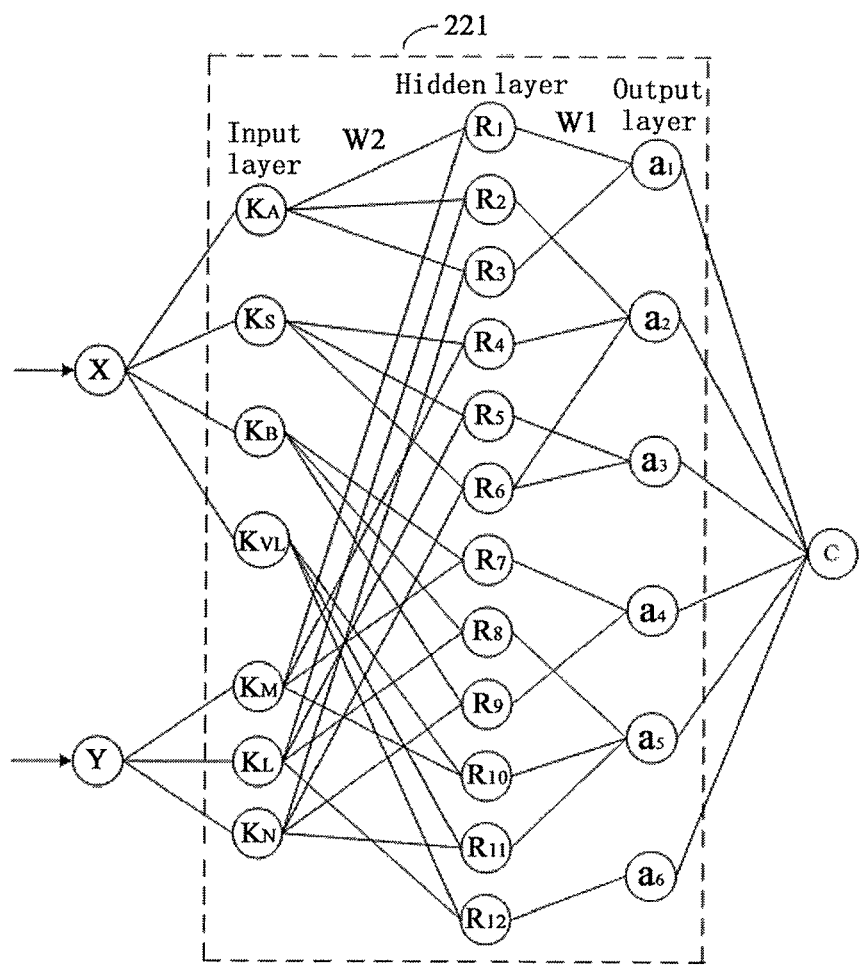
FIG. 5 is a schematic diagram of a fuzzy neural network model used in a color temperature adjustment process according to an embodiment of the present disclosure.

In order to obtain an accurate target color temperature and improve the accuracy of color temperature adjustment, optionally, step S22 is performed using a neutral network model, and the neutral network model and a fuzzification algorithm are combined to generate a fuzzy neural network as shown in FIG. 5. In FIG. 5, node X is configured to input the current ambient luminous flux acquired in step S21, node Y is configured to input current time acquired in step S21, and node C is configured to output the target color temperature; after fuzzification is performed on the current ambient luminous flux and the current time, a neutral network model 221 does further calculation. The fuzzy neutral network brings together the advantages of neutral network and fuzzy theory and combines learning, association, recognition and information processing, and thus, when color temperature adjustment is performed using the fuzzy neutral network model, high adjustment accuracy and good real-time performance can be achieved. It should be noted that FIG. 5 illustrates the case where the environment information includes ambient luminous flux and time and there are four luminous flux fuzzy sets and three time fuzzy sets, but the present disclosure is not limited thereto.

The neutral network model 221 includes an input layer, a hidden layer and an output layer, which are sequentially arranged.

The input layer includes membership degree nodes (hereinafter referred to as "luminous flux membership degree nodes") $K_A$, $K_S$, $K_B$ and $K_{VL}$ in one-to-one correspondence with the plurality of luminous flux fuzzy sets, respectively, and membership degree nodes (hereinafter referred to as "time membership degree nodes") $K_M$, $K_L$ and $K_N$ in one-to-one correspondence with the plurality of time fuzzy sets, respectively. An output value of each luminous flux membership degree node is a membership degree of the ambient luminous flux input from node X with respect to the luminous flux fuzzy set corresponding to the luminous flux membership degree node, and can be obtained according to the luminous flux membership degree function shown in FIG. 2; an output value of each time membership degree node is a membership degree of current time input from node Y with respect to the time fuzzy set corresponding to the time membership degree node, and can be obtained according to the time membership degree function shown in FIG. 3.

The hidden layer includes combination result nodes $R_1$-$R_{12}$ in one-to-one correspondence with the combination results (e.g., combination results of the luminous flux fuzzy sets and the time fuzzy sets), respectively. In the case where a P-th combination result is obtained by combining an i-th luminous flux fuzzy set and a j-th time fuzzy set, an output value of a P-th combination result node corresponding to the P-th combination result can be calculated according to the following formula:

$$R_P = \min(\mu1_i W2_{Pi}, \mu2_j W2_{Pj})$$

where $R_p$ is the output value of the P-th combination result node, $\mu1_i$ is an output value of an i-th luminous flux membership degree node; $\mu2_j$ is an output value of a j-th time membership degree node; $W2_{Pi}$ is a connection weight between the P-th combination result node and the i-th luminous flux membership degree node; and $W2_{Pj}$ is a connection weight between the P-th combination result node and the j-th time membership degree node. That is to say, the output value of each combination result node is obtained by calculation according to the above formula, and can be considered as a possibility of obtaining the combination result corresponding to the combination result node according to the current environment information. It should be understood that, 'i' is an integer larger than zero and smaller than or equal to a total number of the luminous flux membership degree nodes, and 'j' is an integer larger than zero and smaller than or equal to a total number of the time membership degree nodes.

The output layer includes output nodes $a_1$-$a_6$ in one-to-one correspondence with the color temperature fuzzy sets, respectively, and an output value of each output node is the applicability of the corresponding color temperature fuzzy set, and can be calculated according to the following formula:

$$a_Q = \Sigma_P R_P W1_{QP}$$

where $a_Q$ is an output value of a Q-th output node, and $W1_{QP}$ is a connection weight between the Q-th output node and the P-th combination result node. It should be understood that, when the P-th combination result corresponds to the color temperature fuzzy set corresponding to the Q-th output node, the connection weight $W1_{QP}$ between the Q-th output node and the P-th combination result node is not zero; otherwise, the connection weight $W1_{QP}$ is zero. It can be understood that, when there is no connecting line between a node in the hidden layer and a node in the output layer in FIG. 5, it indicates that the connection weight between the two nodes is zero. P is an integer larger than zero and smaller than or equal to a total number of the combination result nodes, and Q is an integer larger than zero and smaller than or equal to a total number of the output nodes. For example, according to table 1, the combination result (corresponding to node $R_1$) of the first luminous flux fuzzy set A and the first time fuzzy set M corresponds to the first color temperature fuzzy set RB (corresponding to node $a_1$) without corresponding to any other color temperature fuzzy set, so the connection weight between node $R_1$ and node $a_1$ is not zero and the connection weight between node $R_1$ and each of nodes $a_2$-$a_6$ is zero in FIG. 5.

Through calculation using the neutral network model, the applicability of each color temperature fuzzy set can be obtained accurately, which increases calculation accuracy of the target color temperature in subsequent defuzzification, and further improves human eye comfort.

Figure 6:
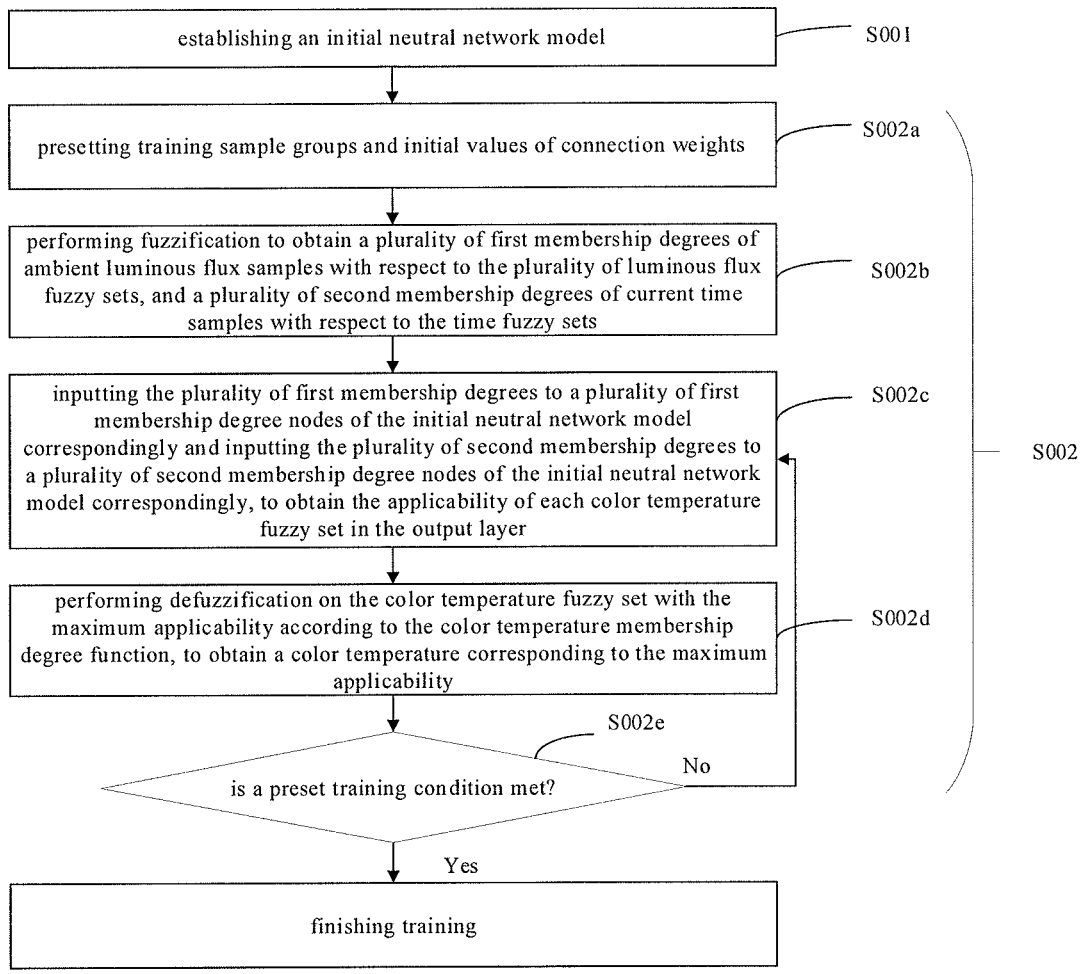
FIG. 6 is a schematic diagram of a process of establishing a neural network model according to an embodiment of the present disclosure.

Further, before step S1 and after step S0, the color temperature adjustment method may include steps of establishing the neutral network model, which, as shown in FIG. 6, include steps S001 and S002.

At step S001, an initial neutral network model is established, in which an initial value of each connection weight is in the range of [−1, 1].

At step S002, the initial neutral network model is trained to adjust the connection weights of the initial neutral network model, and an establishment of the neutral network model is finished when preset training conditions are met.

Step S002 may include steps S002a to S002e.

At step S002a, training sample groups, which include ambient luminous flux samples, current time samples, and target color temperature samples corresponding to both the ambient luminous flux samples and the current time samples, are preset.

At step S002b, fuzzification is performed on the ambient luminous flux samples according to the luminous flux membership degree functions, to obtain the membership degrees (hereinafter referred to as "luminous flux membership degrees") of the ambient luminous flux samples with respect to the luminous flux fuzzy sets; fuzzification is performed on the current time samples according to the time membership degree functions, to obtain the membership degrees (hereinafter referred to as "time membership degrees") of the current time samples with respect to the time fuzzy sets. The combination of this step and the fuzzification algorithm can lower the demand for training sample data.

At step S002c, the luminous flux membership degrees are input to the luminous flux membership degree nodes of the initial neutral network model correspondingly and the time membership degrees are input to the time membership degree nodes of the initial neutral network model correspondingly, to obtain the applicability of each color temperature fuzzy set in the output layer.

At step S002d, defuzzification is performed on the color temperature fuzzy set with the maximum applicability according to the color temperature membership degree function, to obtain a color temperature corresponding to the maximum applicability.

At step S002e, it is determined whether a preset training condition is met, if the preset training condition is met, the training is finished, otherwise, the connection weights are adjusted and the process returns back to step S002c. The preset training condition may be a condition where the number of training times reaches a preset value, or a condition where a difference between the color temperature obtained in step S002d and the target color temperature sample is in a preset range.

An example of adjusting color temperature by using the color temperature adjustment method according to the embodiments of the present disclosure will be described below.

At step one, current ambient luminous flux and current time are acquired at a predetermined frequency.

At step two, the current ambient luminous flux and current time are input into node X and node Y of the fuzzy neutral network model in FIG. 5, respectively. The fuzzy neutral network model outputs a target color temperature at node C after calculation.

Here, the calculation process performed by the fuzzy neutral network model includes:

obtaining the luminous flux membership degrees of the current ambient luminous flux with respect to the luminous flux fuzzy sets according to the luminous flux membership degree functions in FIG. 2, and obtaining the time membership degrees of current time with respect to the time fuzzy sets according to the time membership degree functions in FIG. 3;

inputting the luminous flux membership degrees into the luminous flux membership degree nodes of the neutral network model 221 correspondingly and inputting the time membership degrees into the time membership degree nodes of the neutral network model 221 correspondingly, to obtain the applicability (i.e., the output value of each output node in the output layer) of each color temperature fuzzy set with respect to the environment information using the neutral network model 221; and performing defuzzification on the color temperature fuzzy set with the maximum applicability according to the color temperature membership degree function, to obtain a color temperature corresponding to the maximum applicability, as the target color temperature.

At step three, an electrical signal corresponding to the target color temperature is provided to a light emitting unit, so that the color temperature of the light emitting unit reaches the target color temperature.

Figure 7:
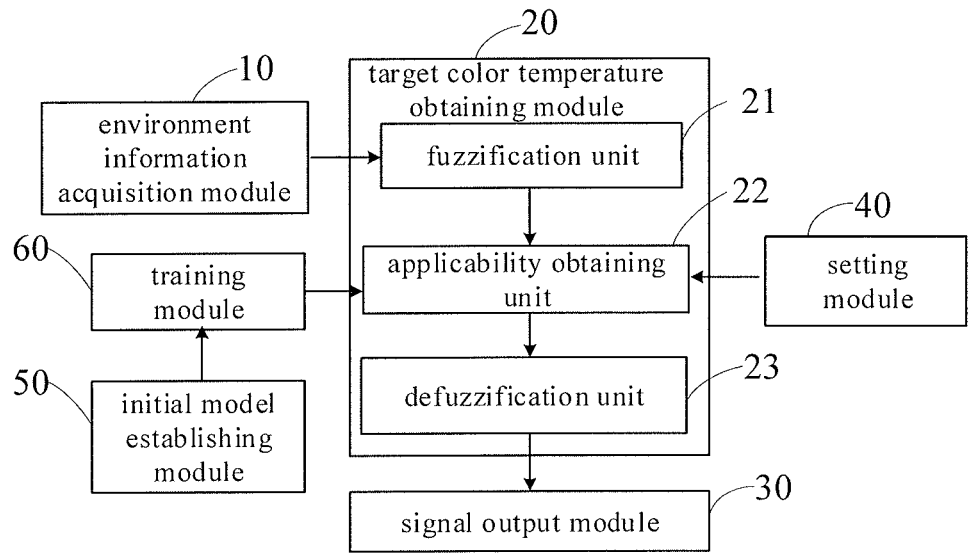
FIG. 7 is a schematic structure diagram of a color temperature adjustment device according to an embodiment of the present disclosure.

As a second aspect of the present disclosure, there is provided a color temperature adjustment device, as shown in FIG. 7, including an environment information acquisition module 10, a target color temperature obtaining module 20 and a signal output module 30. The environment information acquisition module 10 is configured to acquire current environment information at a predetermined frequency. The target color temperature obtaining module 20 is connected with the environment information acquisition module 10 and configured to obtain a target color temperature corresponding to the current environment information. The signal output module 30 is connected with the target color temperature obtaining module 20 and is configured to provide an electrical signal corresponding to the target color temperature to a light emitting unit so that the color temperature of the light emitting unit reaches the target color temperature. The light emitting unit may include a plurality of light bars, on which light beads of red color, green color, blue color or other various colors may be provided.

In order to obtain the target color temperature corresponding to the environment information, the color temperature adjustment device further includes a setting module 40 configured to set, for each type of environment information, a plurality of environment information fuzzy sets and environment membership degree functions between the type of environment information and the environment information fuzzy sets; set a plurality of color temperature fuzzy sets and color temperature membership degree functions between color temperature and the color temperature fuzzy sets; and set a correspondence rule between the environment information fuzzy sets and the color temperature fuzzy sets.

Here, the target color temperature obtaining module 20 obtains the target color temperature using a fuzzy algorithm. Specifically, the target color temperature obtaining module 20 includes a fuzzification unit 21, an applicability obtaining unit 22 and a defuzzification unit 23. The fuzzification unit 21 is configured to perform, for each type of environment information, fuzzification on the current environment information according to the environment membership degree functions, to obtain the membership degrees of the current environment information with respect to the environment information fuzzy sets of the type of environment information. The applicability obtaining unit 22 is connected with the fuzzification unit 21 and the setting module 40, respectively, and configured to obtain the applicability of each color temperature fuzzy set with respect to the current environment information according to the membership degrees of the current environment information with respect to the environment information fuzzy sets and the correspondence rule between the environment information fuzzy sets and the color temperature fuzzy sets. The defuzzification unit 23 is connected with the applicability obtaining unit 22 and configured to perform defuzzification on the color temperature fuzzy set with the maximum applicability according to the color temperature membership degree function, to obtain a color temperature corresponding to the maximum applicability, as the target color temperature.

As described above, the environment information may include ambient luminous flux and time, and the environment information acquisition module 10 may include a sensor for acquiring the ambient luminous flux and a clock chip for acquiring current time. The environment information fuzzy sets include luminous flux fuzzy sets and time fuzzy sets; the environment membership degree functions include luminous flux membership degree functions between the ambient luminous flux and the luminous flux fuzzy sets and time membership degree functions between current time and the time fuzzy sets; the correspondence rule between the environment information fuzzy sets and the color temperature fuzzy sets includes correspondence between a plurality of combination results, obtained by combining the plurality of luminous flux fuzzy sets with the plurality of time fuzzy sets, and the plurality of color temperature fuzzy sets. The correspondence rule indicates a corresponding color temperature fuzzy set when the current ambient luminous flux belongs to an x-th luminous flux fuzzy set and the current time belongs to a y-th time fuzzy set.

Specifically, as shown in FIG. 2, the plurality of luminous flux fuzzy sets may include: a first luminous flux fuzzy set A (corresponding to environment with dark light) for the ambient luminous flux in the range of 0 to 200 lm; a second luminous flux fuzzy set S (corresponding to environment with normal light) for the ambient luminous flux in the range of 50 lm to 2000 lm; a third luminous flux fuzzy set B (corresponding to environment with bright light) for the ambient luminous flux in the range of 200 lm to 5000 lm; a fourth luminous flux fuzzy set VL (corresponding to environment with very bright light) for the ambient luminous flux in the range of 4000 lm to 10000 lm. Herein, the luminous flux membership degree functions (i.e., A(lm), S(lm), B(lm) and VL(lm) shown in the figure) between the ambient luminous flux and the luminous flux fuzzy sets each may be a triangular membership degree function as shown in FIG. 2.

As shown in FIG. 3, the plurality of time fuzzy sets may include: a first time fuzzy set M for the case that current time is in the range of 0 to 10 h (i.e., early hours from 00:00 to 10:00); a second time fuzzy set L for the case that current time is in the range of 9 h to 19 h (i.e., daytime hours from 09:00 to 19:00); and a third time fuzzy set N for the case that current time is in the range of 16 h to 24 h (i.e., night time from 16:00 to 24:00). Herein, the time membership degree functions (i.e., M(h), L(h) and N(h) shown in the figure) between current time and the time fuzzy sets each may be a triangular membership degree function as shown in FIG. 3.

As shown in FIG. 4, the plurality of color temperature fuzzy sets may include: a first color temperature fuzzy set RB (corresponding to reddish light of warm color) for the color temperature in the range of 0 to 3000K; a second color temperature fuzzy set RM (corresponding to normal light of warm color) for the color temperature in the range of 2000K to 4000K; a third color temperature fuzzy set RS (corresponding to normal natural white light) for the color temperature in the range of 3000K to 5000K; a fourth color temperature fuzzy set BS (corresponding to bluish natural white light) for the color temperature in the range of 4000K to 6000K; a fifth color temperature fuzzy set BM (corresponding to normal light of cool color) for the color temperature in the range of 5000K to 8000K; and a sixth color temperature fuzzy set BL (corresponding to bluish light of cool color) for the color temperature in the range of 6000K to 8000K. Herein, the color temperature membership degree functions (i.e., RB(K), RM(K), RS(K), BS(K), BM(K) and BL(K) shown in the figure) between color temperature and the color temperature fuzzy sets each may be a triangular membership degree function as shown in FIG. 4.

The correspondence between the plurality of color temperature fuzzy sets and a plurality of combination results of the luminous flux fuzzy sets and the time fuzzy sets may be as follows: a combination result of the first luminous flux fuzzy set A and the first time fuzzy set M and a combination result of the first luminous flux fuzzy set A and the third time fuzzy set N each correspond to the first color temperature fuzzy set RB; a combination result of the first luminous flux fuzzy set A and the second time fuzzy set L, a combination result of the second luminous flux fuzzy set S and the first time fuzzy set M, a combination result of the second luminous flux fuzzy set S and the third time fuzzy set N and a combination result of the third luminous flux fuzzy set B and the first time fuzzy set M each correspond to the second color temperature fuzzy set RM; a combination result of the second luminous flux fuzzy set S and the second time fuzzy set L corresponds to the third color temperature fuzzy set RS; a combination result of the third luminous flux fuzzy set B and the second time fuzzy set L corresponds to the fourth color temperature fuzzy set BS; a combination result of the third luminous flux fuzzy set B and the third time fuzzy set N, a combination result of the fourth luminous flux fuzzy set VL and the first time fuzzy set M and a combination result of the fourth luminous flux fuzzy set VL and the third time fuzzy set N each correspond to the fifth color temperature fuzzy set BM; and a combination result of the fourth luminous flux fuzzy set VL and the second time fuzzy set L corresponds to the sixth color temperature fuzzy set BL.

In order to obtain an accurate target color temperature and improve the accuracy of color temperature adjustment, optionally, the applicability obtaining unit 22 may obtain the applicability of each color temperature fuzzy set by an established neutral network model. As shown in FIG. 5, the neutral network model 221 includes an input layer, a hidden layer and an output layer, which are sequentially arranged.

The input layer includes luminous flux membership degree nodes $K_A$, $K_S$, $K_B$ and $K_{VL}$ in one-to-one correspondence with the plurality of luminous flux fuzzy sets respectively, and time membership degree nodes $K_M$, $K_L$ and $K_N$ in one-to-one correspondence with the plurality of time fuzzy sets respectively. An output value of each luminous flux membership degree node is a membership degree of the ambient luminous flux input from node X with respect to the luminous flux fuzzy set corresponding to the luminous flux membership degree node, and can be obtained according to the luminous flux membership degree function shown in FIG. 2; an output value of each time membership degree node is a membership degree of current time input from node Y with respect to the time fuzzy set corresponding to the time membership degree node, and can be obtained according to the time membership degree function shown in FIG. 3.

The hidden layer includes combination result nodes $R_1$-$R_{12}$ in one-to-one correspondence with the combination results (e.g., combination results of the luminous flux fuzzy sets and the time fuzzy sets), respectively. In the case where a P-th combination result is obtained by combining an i-th luminous flux fuzzy set and a j-th time fuzzy set, an output value of a P-th combination result node corresponding to the P-th combination result can be calculated according to the following formula:

$$R_P = \min(\mu 1_i W2_{Pi}, \mu 2_j W2_{Pj})$$

where $R_p$ is the output value of the P-th combination result node, $\mu 1_i$ is an output value of an i-th luminous flux membership degree node; $\mu 2_j$ is an output value of a j-th time membership degree node; $W2_{Pi}$ is a connection weight between the P-th combination result node and the i-th luminous flux membership degree node; and $W2_{Pj}$ is a connection weight between the P-th combination result node and the j-th time membership degree node. That is to say, the output value of each combination result node is obtained by calculation according to the above formula, and can be considered as a possibility of obtaining the combination result corresponding to the combination result node according to the current environment information. It should be understood that, 'i' is an integer larger than zero and smaller than or equal to a total number of the luminous flux membership degree nodes, and 'j' is an integer larger than zero and smaller than or equal to a total number of the time membership degree nodes.

The output layer includes output nodes $a_1$-$a_6$ in one-to-one correspondence with the color temperature fuzzy sets, respectively, and an output value of each output node is the applicability of the corresponding color temperature fuzzy set, and can be calculated according to the following formula:

$$a_Q = \Sigma_P R_P W1_{QP}$$

where $a_Q$ is an output value of a Q-th output node, and $W1_{QP}$ is a connection weight between the Q-th output node and the P-th combination result node.

The applicability obtaining unit 22 can calculate the applicability of each color temperature fuzzy set accurately through the neutral network model, which can increase calculation accuracy of the target color temperature in subsequent defuzzification, and further improve human eye comfort.

Further, in order to establish the neutral network model, the color temperature adjustment device also includes:

an initial model establishing module 50, configured to establish an initial neutral network model, in which an initial value of each connection weight is in the range of [−1, 1]; and a training module 60, configured to train the initial neutral network model to adjust the connection weights of the neutral network model, and finish establishment of the neutral network model when a preset training condition is met. The process that the training module 60 trains the neutral network model has been described above, and will not be repeatedly described here.

It can be seen that, in the present disclosure, the color temperature of the light emitting unit can be adjusted according to environment information, so that under different circumstances, the color temperature of the light emitting unit always adapts to the environment in which the light emitting unit is located, thus improving human eye comfort. In the color temperature adjustment process according the embodiments of the present disclosure, the fuzzy algorithm and the neutral network model are combined, which improves the accuracy of color temperature adjustment; besides, after the training of the neutral network model is finished, the target color temperature can be obtained quickly using the fuzzy algorithm and the neutral network model each time current environment information is acquired, and in this way, there is no need to provide a specific formula between the target color temperature and current environment information, which makes the color temperature adjustment have higher real-time performance and easier to implement.

As a third aspect of the present disclosure, there is provided a light source including a light emitting unit and the above color temperature adjustment device.

As a fourth aspect of the present disclosure, there is provided a display apparatus including a display panel and the above light source, the light source being configured as a backlight source of the display apparatus.

Because the color temperature adjustment device can adjust the color temperature of the light emitting unit according to environment information and achieve color temperature adjustment with good real-time performance and high accuracy, light from the backlight source gives human eyes a more comfortable feeling, and the color of a screen displayed by the display apparatus gives people a more comfortable visual experience.

The device for adjusting color temperature described in the present disclosure is a device for implementing the color temperature adjustment method provided in the present disclosure, and is thus based on the color temperature adjustment method described in the present disclosure. A person skilled in the art can understand specific implementations and various variants of the device for adjusting color temperature of the embodiments, and thus, detailed description on how the device for adjusting color temperature implements the color temperature adjustment method in the present disclosure will not be given herein. All devices that are adopted to implement the color temperature adjustment method in the present disclosure by a person skilled in the art should fall into the scope to be protected by this application.

Many functional units described in this specification are labeled as modules, in order to further emphasize their implementation independence. For example, a module may be implemented as a hardware circuit comprising custom VLSI circuits or hardware circuits of gate arrays, and existing semiconductors such as logic chips, transistors, or other discrete components. Modules may be implemented by, for example, field programmable gate arrays, programmable array logic, programmable logic devices or the like. Modules may also be implemented by software for execution by various types of processors. An identified module of executable code may, for example, comprise one or more physical or logical blocks of computer instructions, and the blocks may be organized as an object, procedure, function, or other configuration. However, the executable codes of an identified module need not be physically located together, but may comprise disparate instructions stored in different locations which, when these instructions are logically connected together, constitute the module and achieve the stated purpose of the module. Indeed, a module of executable code may be a single instruction, or many instructions, and may even be distributed over several different code segments, among different programs and across several memory devices. Similarly, operational data may be identified and illustrated herein within modules, and may be implemented in any suitable form and organized within any suitable type of data structure. Operational data may be concentrated into a single data set, or may be distributed over different locations including over different storage devices, and may exist at least partially, merely as electronic signals on a system or network.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. A color temperature adjustment method, comprising:
acquiring current environment information;
obtaining a target color temperature corresponding to the current environment information by using fuzzy neutral network; and
adjusting a color temperature of a light emitting unit to be the target color temperature,
wherein, before the step of acquiring the current environment information, the color temperature adjustment method further comprises:
for each type of environment information, setting a plurality of environment information fuzzy sets and a plurality of environment membership degree functions between the environment information and the plurality of environment information fuzzy sets; setting a plurality of color temperature fuzzy sets and a plurality of color temperature membership degree functions between color temperature and the plurality of color temperature fuzzy sets; and setting a correspondence rule between the environment information fuzzy sets and the color temperature fuzzy sets.

2. The color temperature adjustment method of claim 1, wherein, the step of obtaining the target color temperature corresponding to the current environment information by using fuzzy neutral network comprises:
for each type of environment information, performing fuzzification on the current environment information according to the environment membership degree functions to obtain respective membership degrees of the current environment information with respect to the environment information fuzzy sets;
obtaining, through a neutral network model, applicability of each color temperature fuzzy set with respect to the current environment information according to the membership degrees of the current environment information with respect to the environment information fuzzy sets and the correspondence rule between the environment information fuzzy sets and the color temperature fuzzy sets; and
performing defuzzification on the color temperature fuzzy set with the maximum applicability according to the color temperature membership degree function, to obtain a color temperature corresponding to the maximum applicability as the target color temperature.

3. The color temperature adjustment method of claim 2, wherein, the environment information comprises first environment information and second environment information; the environment information fuzzy sets comprise a plurality of first fuzzy sets for the first environment information and a plurality of second fuzzy sets for the second environment information; the environment membership degree functions comprise a plurality of first membership degree functions between the first environment information and the plurality of first fuzzy sets and a plurality of second membership degree functions between the second environment information and the plurality of second fuzzy sets; and the correspondence rule between the environment information fuzzy sets and the color temperature fuzzy sets comprises correspondence between a plurality of combination results, obtained by combining the plurality of first fuzzy sets and the plurality of second fuzzy sets, and the plurality of color temperature fuzzy sets.

4. The color temperature adjustment method of claim 3, wherein, the neutral network model comprises an input layer, a hidden layer and an output layer which are sequentially arranged,
the input layer comprises a plurality of first membership degree nodes in one-to-one correspondence with the plurality of first fuzzy sets respectively and a plurality of second membership degree nodes in one-to-one correspondence with the plurality of second fuzzy sets respectively, an output value of each first membership degree node being a membership degree of the first environment information with respect to the first fuzzy set corresponding to the first membership degree node, and an output value of each second membership degree node being a membership degree of the second environment information with respect to the second fuzzy set corresponding to the second membership degree node;
the hidden layer comprises a plurality of combination result nodes in one-to-one correspondence with the plurality of combination results respectively, wherein when a P-th combination result is obtained by combining an i-th first fuzzy set and a j-th second fuzzy set, an output value of a P-th combination result node corresponding to the P-th combination result is calculated according to a following formula:

$$R_P = \min(\mu 1_i W2_{Pi}, \mu 2_j W2_{Pj})$$

where $R_P$ is the output value of the P-th combination result node, $\mu 1_i$ is an output value of an i-th first membership degree node; $\mu 2_j$ is an output value of a j-th second membership degree node; $W2_{Pi}$ is a connection weight between the P-th combination result node and the i-th first membership degree node; and $W2_{Pj}$ is a connection weight between the P-th combination result node and the j-th second membership degree node; and the output layer comprises a plurality of output nodes in one-to-one correspondence with the plurality of color temperature fuzzy sets respectively, wherein an output value of each output node is applicability of a corresponding color temperature fuzzy set, and is calculated according to a following formula:

$$a_Q = \Sigma_p R_p W1_{QP}$$

where $a_Q$ is an output value of a Q-th output node, and $W1_{QP}$ is a connection weight between the Q-th output node and the P-th combination result node.

5. The color temperature adjustment method of claim 2, wherein, before the step of acquiring the current environment information, the color temperature adjustment method further comprises:
   establishing an initial neutral network model, in which an initial value of each connection weight is in a range of [−1, 1]; and
   training the initial neutral network model to adjust the connection weights of the neutral network model, and finishing establishment of the neutral network model when a training condition is met.

6. The color temperature adjustment method of claim 1, wherein, the environment information comprises one or more of ambient luminous flux, current time, ambient atmosphere pressure, ambient temperature and weather.

7. The color temperature adjustment method of claim 3, wherein, the first environment information is ambient luminous flux, the second environment information is current time; the plurality of first fuzzy sets are a plurality of luminous flux fuzzy sets, the plurality of second fuzzy sets are a plurality of time fuzzy sets; the environment membership degree functions comprise a plurality of luminous flux membership degree functions between the ambient luminous flux and the plurality of luminous flux fuzzy sets, and a plurality of time membership degree functions between the current time and the plurality of time fuzzy sets; the correspondence rule between the environment information fuzzy sets and the color temperature fuzzy sets comprises correspondence between a plurality of combination results, obtained by combining the plurality of luminous flux fuzzy sets and the plurality of time fuzzy sets, and the plurality of color temperature fuzzy sets.

8. The color temperature adjustment method of claim 7, wherein, each of the plurality of luminous flux membership degree functions between the ambient luminous flux and the plurality of luminous flux fuzzy sets is a triangular membership degree function, each of the plurality of time membership degree functions between the current time and the plurality of time fuzzy sets is a triangular membership degree function, and each of the plurality of color temperature membership degree functions between the color temperature and the plurality of color temperature fuzzy sets is a triangular membership degree function.

9. The color temperature adjustment method of claim 8, wherein, the plurality of luminous flux fuzzy sets comprise:
   a first luminous flux fuzzy set for the ambient luminous flux of 0 to 200 lm;
   a second luminous flux fuzzy set for the ambient luminous flux of 50 lm to 2000 lm;
   a third luminous flux fuzzy set for the ambient luminous flux of 200 lm to 5000 lm; and
   a fourth luminous flux fuzzy set for the ambient luminous flux of 4000 lm to 10000 lm.

10. The color temperature adjustment method of claim 9, wherein, the plurality of time fuzzy sets comprise:
   a first time fuzzy set for the case that the current time is in a range of 0 to 10 h;
   a second time fuzzy set for the case that the current time is in a range of 9 h to 19 h; and
   a third time fuzzy set for the case that the current time is in a range of 16 h to 24 h.

11. The color temperature adjustment method of claim 10, wherein, the plurality of color temperature fuzzy sets comprise:
   a first color temperature fuzzy set for the color temperature of 0 to 3000K;
   a second color temperature fuzzy set for the color temperature of 2000K to 4000K;
   a third color temperature fuzzy set for the color temperature of 3000K to 5000K;
   a fourth color temperature fuzzy set for the color temperature of 4000K to 6000K;
   a fifth color temperature fuzzy set for the color temperature of 5000K to 8000K; and
   a sixth color temperature fuzzy set for the color temperature of 6000K to 8000K.

12. The color temperature adjustment method of claim 11, wherein, the correspondence between the plurality of combination results and the plurality of color temperature fuzzy sets is as follows:
   a combination result of the first luminous flux fuzzy set and the first time fuzzy set and a combination result of the first luminous flux fuzzy set and the third time fuzzy set each correspond to the first color temperature fuzzy set;
   a combination result of the first luminous flux fuzzy set and the second time fuzzy set, a combination result of the second luminous flux fuzzy set and the first time fuzzy set, a combination result of the second luminous flux fuzzy set and the third time fuzzy set and a combination result of the third luminous flux fuzzy set and the first time fuzzy set each correspond to the second color temperature fuzzy set;
   a combination result of the second luminous flux fuzzy set and the second time fuzzy set corresponds to the third color temperature fuzzy set;
   a combination result of the third luminous flux fuzzy set and the second time fuzzy set corresponds to the fourth color temperature fuzzy set;
   a combination result of the third luminous flux fuzzy set and the third time fuzzy set, a combination result of the fourth luminous flux fuzzy set and the first time fuzzy set and a combination result of the fourth luminous flux fuzzy set and the third time fuzzy set each correspond to the fifth color temperature fuzzy set; and
   a combination result of the fourth luminous flux fuzzy set and the second time fuzzy set corresponds to the sixth color temperature fuzzy set.

13. A device for adjusting color temperature using the color temperature adjustment method of claim 1, comprising a processor functioning as:
   an environment information acquisition module configured to acquire current environment information;
   a target color temperature obtaining module connected with the environment information acquisition module and configured to obtain a target color temperature corresponding to the current environment information using fuzzy neutral network;
   an adjustment module connected with the target color temperature obtaining module and configured to adjust a color temperature of a light emitting unit to be the target color temperature; and a setting module configured to set, for each type of environment information, a plurality of environment information fuzzy sets and a plurality of environment membership degree functions between the environment information and the plurality of environment information fuzzy sets; set a plurality of color temperature fuzzy sets and a plurality of color temperature membership degree functions between color temperature and the plurality of color temperature fuzzy sets; and set a correspondence rule between the environment information fuzzy sets and the color temperature fuzzy sets.

14. The device of claim 13,
wherein the processor further functions as:
a fuzzification unit configured to perform, for each type of environment information, fuzzification on the current environment information according to the environment membership degree functions, to obtain respective membership degrees of the current environment information with respect to the environment information fuzzy sets;
an applicability obtaining unit connected with the fuzzification unit and the setting module, respectively, and configured to obtain, through a neutral network model, the applicability of each color temperature fuzzy set with respect to the current environment information according to the membership degrees of the current environment information with respect to the environment information fuzzy sets and the correspondence rule between the environment information fuzzy sets and the color temperature fuzzy sets; and
a defuzzification unit connected with the applicability obtaining unit and configured to perform defuzzification on the color temperature fuzzy set with the maximum applicability according to the color temperature membership degree function, to obtain a color temperature corresponding to the maximum applicability as the target color temperature.

15. The device of claim 14, wherein, the environment information comprises first environment information and second environment information; the environment information fuzzy sets comprise a plurality of first fuzzy sets for the first environment information and a plurality of second fuzzy sets for the second environment information; the environment membership degree functions comprise a plurality of first membership degree functions between the first environment information and the plurality of first fuzzy sets and a plurality of second membership degree functions between the second environment information and the plurality of second fuzzy sets; and the correspondence rule between the environment information fuzzy sets and the color temperature fuzzy sets comprises correspondence between a plurality of combination results, obtained by combining the plurality of first fuzzy sets and the plurality of second fuzzy sets, and the plurality of color temperature fuzzy sets.

16. The device of claim 15, wherein, the neutral network model comprises an input layer, a hidden layer and an output layer which are sequentially arranged,
the input layer comprises a plurality of first membership degree nodes in one-to-one correspondence with the plurality of first fuzzy sets respectively and a plurality of second membership degree nodes in one-to-one correspondence with the plurality of second fuzzy sets respectively, an output value of each first membership degree node being a membership degree of the first environment information with respect to the first fuzzy set corresponding to the first membership degree node, and an output value of each second membership degree node being a membership degree of the second environment information with respect to the second fuzzy set corresponding to the second membership degree node;
the hidden layer comprises a plurality of combination result nodes in one-to-one correspondence with the plurality of combination results respectively, wherein when a P-th combination result is obtained by combining an i-th first fuzzy set and a j-th second fuzzy set, an output value of a P-th combination result node corresponding to the P-th combination result is calculated according to a following formula:

$$R_P = \min(\mu 1_i W2_{Pi}, \mu 2_j W2_{Pj})$$

where, $R_p$ is the output value of the P-th combination result node, $\mu 1_i$ is an output value of an i-th first membership degree node; $\mu 2_j$ is an output value of a j-th second membership degree node; $W2_{Pi}$ is a connection weight between the P-th combination result node and the i-th first membership degree node; and $W2_{Pj}$ is a connection weight between the P-th combination result node and the j-th second membership degree node; and
the output layer comprises a plurality of output nodes in one-to-one correspondence with the plurality of color temperature fuzzy sets respectively, wherein an output value of each output node is applicability of a corresponding color temperature fuzzy set, and is calculated according to a following formula:

$$a_Q = \Sigma_P R_P W1_{QP}$$

where $a_Q$ is an output value of a Q-th output node, and $W1_{QP}$ is a connection weight between the Q-th output node and the P-th combination result node.

17. The device of claim 13, wherein, the environment information comprises one or more of ambient luminous flux, current time, ambient atmosphere pressure, ambient temperature and weather.

18. A light source, comprising a light emitting device and a color temperature adjustment device connected to the light emitting device, wherein, the color temperature adjustment device is the device of claim 13.

19. A display apparatus, comprising a display panel and the light source of claim 18, wherein, the light source is configured as a backlight source of the display apparatus.

* * * * *